United States Patent
Wittkopp et al.

(10) Patent No.: US 7,743,678 B2
(45) Date of Patent: Jun. 29, 2010

(54) SELECTABLE ONE-WAY ROCKER CLUTCH

(75) Inventors: Scott H. Wittkopp, Ypsilanti, MI (US);
James M. Hart, Belleville, MI (US);
Clinton E. Carey, Monroe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 473 days.

(21) Appl. No.: 11/742,859

(22) Filed: May 1, 2007

(65) Prior Publication Data

US 2007/0278061 A1 Dec. 6, 2007

Related U.S. Application Data

(60) Provisional application No. 60/803,556, filed on May 31, 2006.

(51) Int. Cl.
*F16H 3/08* (2006.01)
*F16H 3/38* (2006.01)
*F16D 11/06* (2006.01)
*F16D 13/04* (2006.01)

(52) U.S. Cl. ........................... 74/339; 74/330; 192/43.1; 192/47

(58) Field of Classification Search ...................... 475/5, 475/8; 74/339, 330, 331, 340; 192/43.1, 192/46, 47, 69.1; 903/913
See application file for complete search history.

(56) References Cited

U.S. PATENT DOCUMENTS

| | | | | |
|---|---|---|---|---|
| 2,710,504 | A * | 6/1955 | Dodge | .......................... 60/345 |
| 5,251,503 | A | 10/1993 | Morris et al. | |
| 5,992,592 | A | 11/1999 | Showalter | |
| 6,290,044 | B1 | 9/2001 | Burgman et al. | |
| 6,409,001 | B1 | 6/2002 | Kerr | |
| 6,427,547 | B1 * | 8/2002 | Bowen | .......................... 74/329 |
| 6,446,776 | B1 | 9/2002 | Kerr | |
| 6,814,201 | B2 * | 11/2004 | Thomas | ....................... 192/43.1 |
| 6,905,009 | B2 * | 6/2005 | Reed et al. | ................... 192/43.1 |
| 7,258,214 | B2 * | 8/2007 | Pawley et al. | ............... 192/43.1 |
| 7,344,010 | B2 * | 3/2008 | Fetting et al. | .............. 192/43.1 |
| 7,484,605 | B2 * | 2/2009 | Pawley et al. | ............... 192/43.1 |
| 7,491,151 | B2 * | 2/2009 | Maguire et al. | .............. 477/107 |
| 7,563,191 | B2 * | 7/2009 | Maguire et al. | .............. 475/276 |
| 2006/0021835 | A1 | 2/2006 | Kimes et al. | |
| 2006/0150760 | A1 | 7/2006 | Maguire | |
| 2006/0278486 | A1 | 12/2006 | Pawley et al. | |
| 2006/0278487 | A1 | 12/2006 | Pawley et al. | |
| 2007/0278061 | A1 | 12/2007 | Wittkopp et al. | |
| 2008/0185253 | A1 | 8/2008 | Kimes | |

OTHER PUBLICATIONS

Office Action for Application No. 11/622,602 mailed Jun. 15, 2009.

* cited by examiner

*Primary Examiner*—Tisha D Lewis (57) ABSTRACT

A selectable one-way rocker clutch assembly includes an inner race disposed radially within an outer race, first and second plurality of rockers, a selector ring and an apply plate. The inner race defines a plurality of pockets configured to operatively retain the first and second plurality of rockers. The first plurality of rockers is configured to resist rotation of the outer race relative to the inner race in a first direction. The second plurality of rockers is configured to resist rotation of the outer race relative to the inner race in a second direction. The selector ring is disposed radially between the inner race and outer race. The apply plate is configured to engage with the selector ring and, in so doing, rotate the selector ring to thereby selectively retract the first and/or second plurality of rockers and thus control the state of the rocker clutch assembly.

18 Claims, 8 Drawing Sheets

SELECTABLE ONE-WAY ROCKER CLUTCH

CROSS REFERENCE TO RELATED APPLICATIONS

This application claims priority to U.S. Provisional Patent Application No. 60/803,556, filed on May 31, 2006, which is hereby incorporated by reference in its entirety.

TECHNICAL FIELD

The present invention pertains generally to rocker clutches having selectively variable modes of operation.

BACKGROUND OF THE INVENTION

Traditional automotive vehicles include a powertrain that is comprised of an engine, a multi-speed transmission, and a differential or final drive system. The multi-speed transmission increases the overall operating range of the vehicle by permitting the engine to operate through its torque range a number of times. The number of forward speed ratios that are available in the transmission is indicative of the number of times the engine torque range is repeated.

Automatic transmissions (e.g., planetary gear type) and manual shifting transmissions (e.g., countershaft type) constitute the two main varieties of automotive transmissions. Early automatic transmissions had two speed ranges. This severely limited the overall speed range of the vehicle and therefore required a relatively large engine that could produce a wide speed and torque range. This resulted in the engine operating at a specific fuel consumption level during cruising, other than the most efficient level. Therefore, historically, manually-shifted transmissions were the most popular.

With the advent of three- and four-speed automatic transmissions, the automatic shifting transmission increased in popularity with the motoring public. These transmissions improved the operating performance and fuel economy of the vehicle. Increasing the number of speed ratios in an automatic transmission reduces the step size between each ratio, improving the shift quality of the transmission by making the ratio interchanges substantially imperceptible to the operator under normal vehicle acceleration. Furthermore, by varying the gear ratios within the transmission, the internal combustion engine may operate below the maximum rotational speed and preferably near the engine speed range that provides the best performance and/or fuel economy.

Automatic transmissions generally effect a ratio change by altering the power delivery path after selective actuation of one or more friction elements, commonly referred to as either a clutch or brake mechanism. The aforesaid friction elements may include, for example, a one-way clutch configured to selectively transfer torque in a first direction, and to interrupt the transfer of torque in the opposite direction. As an example, a one-way clutch may be implemented to transfer torque from an engine to the transmission, and to interrupt the transfer of reverse torque from the transmission to the engine.

SUMMARY OF THE INVENTION

A selectable one-way rocker clutch assembly is provided having a first race radially disposed with respect to a second race. The first race defines a plurality of pockets, whereas the second race defines a plurality of teeth. A plurality of rockers is at least partially positioned within respective ones of the plurality of pockets and is configured to engage with the teeth of the second race to thereby resist or prevent rotation of the first race relative to the second race. The selectable one-way rocker clutch assembly also includes a selector member radially disposed with respect to the first and second races. The selector member is selectively rotatable between at least a first and a second position, and configured to prevent engagement of at least one of the plurality of rockers with the teeth of the second race when the selector is in the second position.

Preferably, the aforementioned plurality of rockers defines a first and second plurality of rockers. The first plurality of rockers is configured to prevent rotation of the outer race with respect to the inner race in a first direction when engaged with the teeth of the second race. The second plurality of rockers is configured to prevent rotation of the outer race with respect to the inner race in a second direction when engaged with the teeth of the second race.

Ideally, the selectable one-way rocker clutch assembly also includes an apply plate. The apply plate is configured to translate toward and/or away from the selector member along a common axis of rotation to selectively engage or interface with the selector member to thereby control the position of the selector member with respect to the first and second plurality of rockers. An actuator can also be operatively connected with the apply plate to provide the abovementioned selective translation of the apply plate toward and/or away from the selector member.

It is further preferred that the selectable one-way rocker clutch assembly include a plurality of biasing members, such as springs. Incidentally, it is also preferred that each of the first and second plurality of rockers is biased by a respective one of the springs into engagement with the teeth of the second race to thereby resist rotation of the first race relative to the second race.

It is even further preferred that the selector member have a generally annular or ring shape, and be at least partially radially disposed between the first and second races. Ideally, the selector member defines a plurality of apertures or windows that are configured to allow the first and second plurality of rockers to extend there through when the selector member is in the first position. To this regard, the selector member also defines a body portion which is configured to prevent engagement of at least the second plurality of rockers with the teeth of the second race when the selector member is in the second position.

Notably, the first race may be disposed radially within the second race and, conversely, the second race may be disposed radially within the first race within the scope of the present invention.

The above features and advantages, and other features and advantages of the present invention, will be readily apparent from the following detailed description of the preferred embodiments and best modes for carrying out the invention when taken in connection with the accompanying drawings.

DESCRIPTION OF THE PREFERRED EMBODIMENTS

Figure 1:
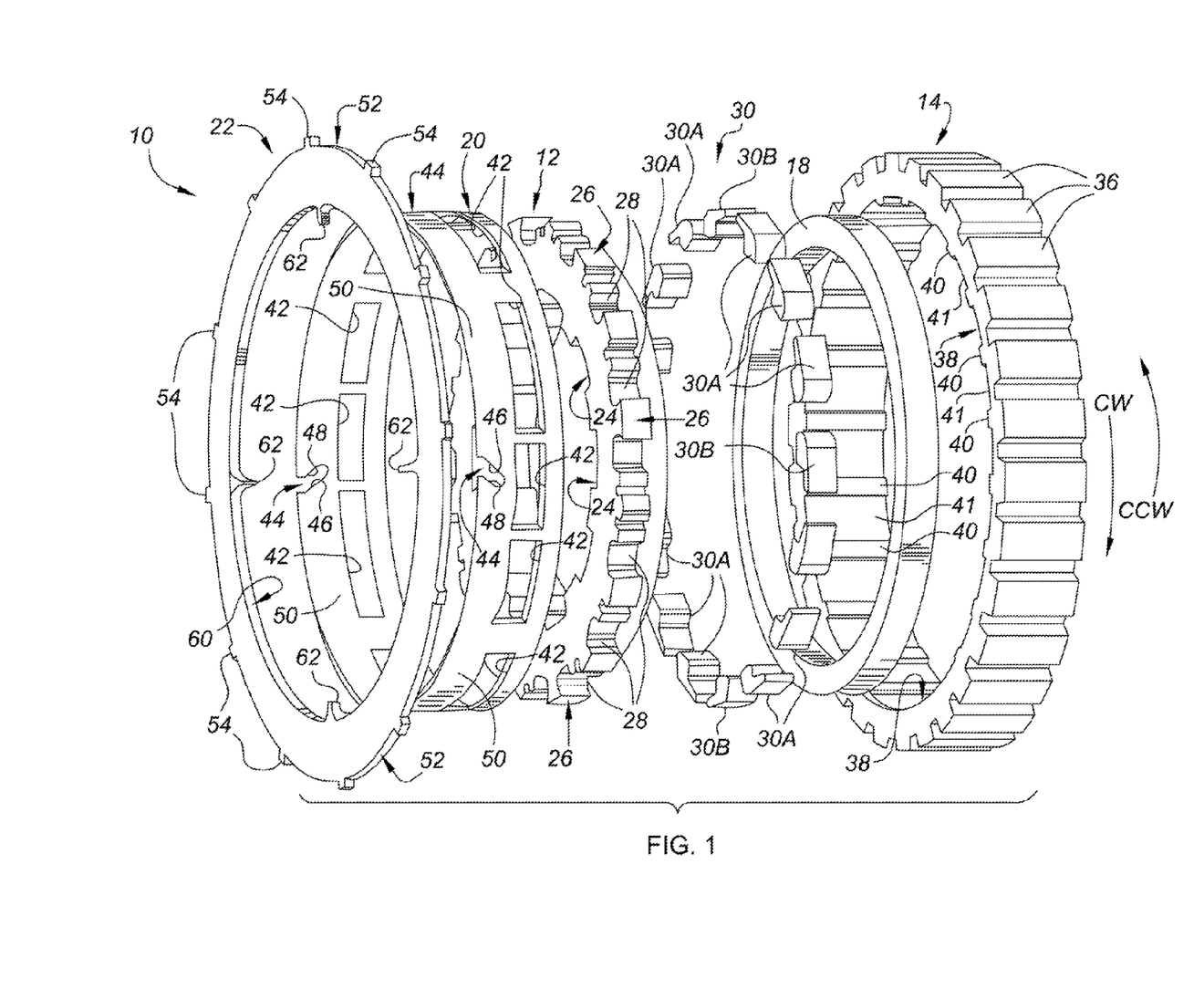
FIG. 1 is an exploded perspective view of a rocker clutch assembly including an apply plate, a selector ring, inner and outer races, a bushing, and a plurality of rockers in accordance with the present invention.

Referring to the drawings wherein like reference numbers refer to like components, FIG. 1 shows an exploded view of a selectable one-way rocker clutch assembly 10. The rocker clutch assembly 10 is controllable to transmit torque in two rotational directions (i.e., clockwise and counter clockwise), or to transmit torque in one direction and overrun (i.e., freewheel in a disengaged state) in the opposite direction. The rocker clutch assembly 10 may be used, for example, to control the torque transfer in an automatic transmission, a manual transmission, a hybrid vehicle transmission, a dual clutch transmission, a transfer case, or an engine accessory drive.

Figure 2A:
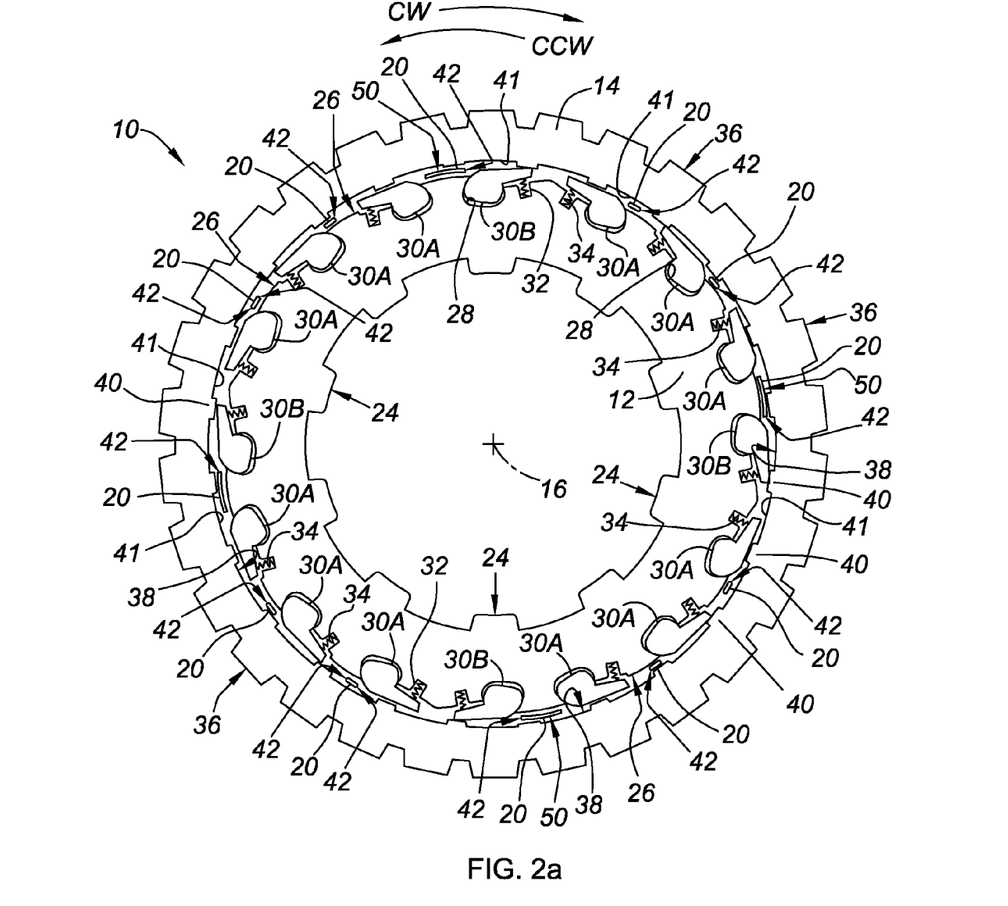
FIG. 2a is a schematic side-view, taken along a plane that is perpendicular to an axis of rotation, of the clutch assembly of FIG. 1 illustrating the selector ring in a first position.

The rocker clutch assembly 10 includes a generally annular inner race 12 and a generally annular outer race 14, with the inner and outer races 12, 14 positioned coaxially about an axis of rotation 16 (best seen in FIG. 2a). A bushing 18 is preferably provided to pilot or guide the outer race 14 as it rotates relative to the inner race 12. A selector member, such as selector ring 20, is positioned radially between the inner race 12 and the outer race 14. The rocker clutch assembly 10 also includes an apply member, such as apply plate 22, that is selectively translatable in an axial direction, e.g., along axis 16 of FIG. 2, in order to rotate the selector ring 20, as will be described in detail below.

For purposes of the present invention, the status of the rocker clutch assembly 10 is either "locked" or "released". The rocker clutch assembly 10 is "locked" when the inner and outer races 12, 14 are coupled together such that torque is transferable in both directions through the rocker clutch assembly 10. The rocker clutch assembly 10 is "released" when the inner and outer races 12, 14 rotate independently such that torque is not transferable in at least one direction through the rocker clutch assembly 10.

Figure 5:
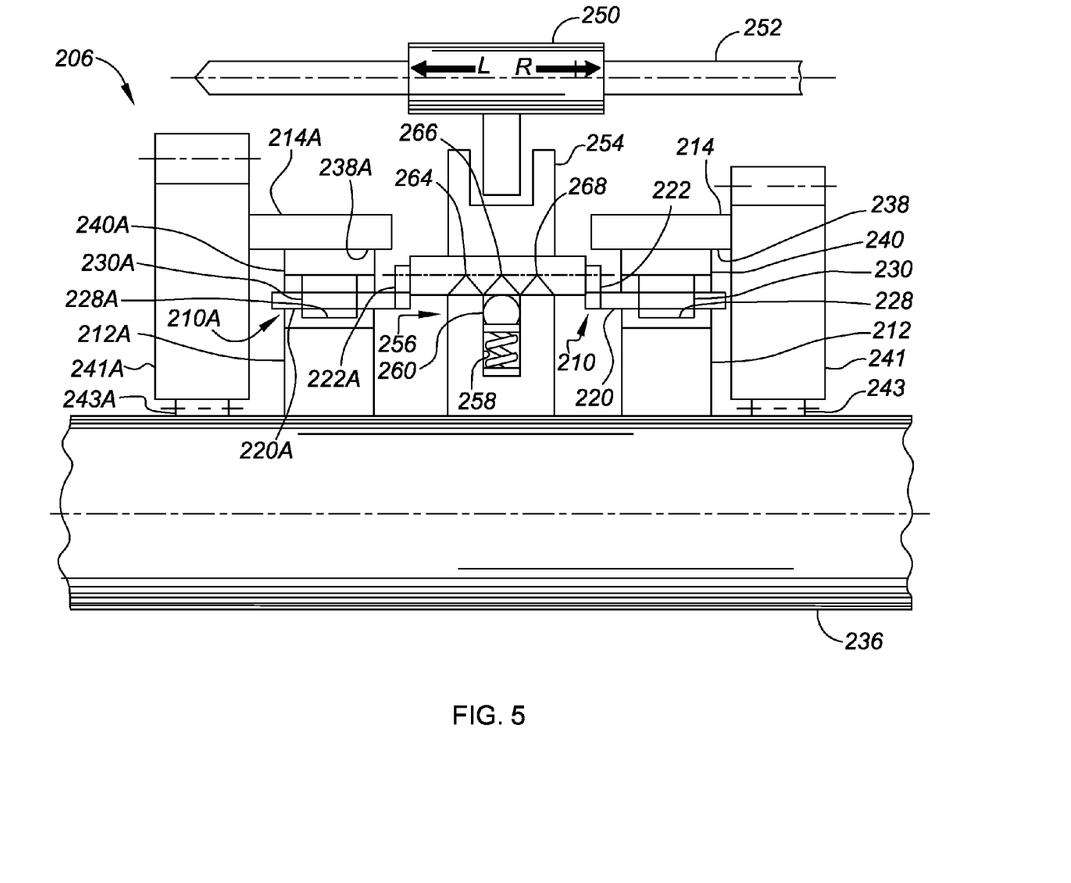
FIG. 5 is a schematic fragmentary cross-sectional view of an exemplary manual transmission having two input shaft-mounted selectable one-way rocker clutch assemblies.

The inner race 12 defines an inner surface 24 that is preferably splined to facilitate attachment to a shaft member, e.g., input shaft 236 of FIG. 5. The outer surface 26 of the inner race 12 defines a plurality of pockets 28 each configured to retain a rocker 30. Each pocket 28 includes a recess, shown at 32 in FIG. 2a, adapted to retain a biasing member, such as, by way of example, coil spring 34 of FIG. 2a. The springs 34 extend from a respective recess 32 and engage a rocker 30 such that a portion of the rocker 30 is biased into engagement with the outer race 14, as will be described in detail hereinafter.

Referring again to FIG. 1, the outer race 14 defines an outer surface 36 that is preferably splined to facilitate attachment to a shaft member (not shown) or gear, e.g., first and second gears 240, 240A, respectively, of FIG. 5. The inner surface 38 of the outer race 14 defines a plurality of teeth 40, which define slots 41 therebetween.

Alternatively, the inner surface 38 of the outer race 14 may define a plurality of pockets, configured to retain a plurality of rockers therein, and recesses, adapted to retain biasing members, functioning as described with respect to the pockets 28, rockers 30, recesses 32, spring 34, and outer surface 26 of the inner race 12 above. In this regard, the outer surface 26 of the inner race 12 would define a plurality of teeth configured for selective engagement with rockers, functioning as described above with respect to the teeth 40 and inner surface 38 of the outer race 14.

The selector ring 20 includes a generally annular body portion 50 defining a plurality of apertures or windows 42 and a plurality of guide slots 44. The windows 42 are configured to allow a respective rocker 30 to advance or pass therethrough, in a radial direction, interface or engage with one of the teeth 40 on the outer race 14, and thereby lock-up the rocker clutch assembly 10. A body portion 50 of the selector ring 20 functions so as to prevent a respective rocker 30 from engaging the outer race 14 such that the rocker clutch assembly 10 can overrun in one or both directions. Therefore, as will be described in detail hereinbelow, the status of the clutch (i.e., either locked or released) is selectable by positioning the body portion 50 and the windows 42 of the selector ring 20 relative to the rockers 30.

The plurality of rockers 30 include a first plurality of rockers 30A and a second plurality of rockers 30B. The first and second plurality of rockers 30A, 30B are generally identical, but are positioned differently within the inner race 12. More specifically, the first plurality of rockers 30A is ideally configured to engage with the plurality of teeth 40 and thereby resist the clockwise CW rotation of the outer race 14 relative to the inner race 12. Furthermore, the second plurality of rockers 30B are ideally configured to engage with the plurality of teeth 40 and thereby resist the counter clockwise CCW rotation of the outer race 14 relative to the inner race 12.

The slots 44 are preferably formed at an angle of approximately 45 degrees relative to the axis of rotation defined through the generally annular selector ring 20 (e.g., axis 16 of FIG. 3). Each slot 44 defines a first surface 46 and a second surface 48, which are correspondingly formed at an angle of approximately 45 degrees.

Referring still to FIG. 1, the apply plate 22 has a radially outer surface 52 defining a plurality of teeth 54, and a radially inner surface 60 defining a plurality of pins 62. The teeth 54 are configured to engage a complementary feature on an external member (e.g., stationary member 112, FIG. 4) such that the apply plate 22 is prevented from rotating about the axis 16, FIG. 2a. The pins 62 are substantially axially aligned with the selector ring guide slots 44. As the apply plate 22 is translated in an axial direction toward the inner race 12, each pin 62 engages and imparts a force onto the first surface 46 of a complementary slot 44. The angle of approximately 45 degrees of the first surface 46 converts the axially applied force from pin 62 into a radially applied force, thereby tending to rotate the selector ring 20 in a counterclockwise CCW direction. Similarly, as the apply plate 22 is translated in an axial direction away from the inner race 12, each pin 62 engages and imparts a force onto the second surface 48 of a complementary slot 44. The 45 degree angle of the second surface 48 converts the axially applied force from pin 62 into a radially applied force tending to rotate the selector ring 20 in a clockwise CW direction.

Ideally, rotation of the selector ring 20 in a counterclockwise CCW direction will arrange, dispose, or locate the windows 42 such that the clutch assembly 10 is in an engaged or active first position, wherein both first and second plurality of rockers 30A, 30B are in an engageable state with the inner surface 38 of the outer race 14. See FIGS. 2a-2e. Conversely, rotation of the selector ring 20 in a clockwise CW direction will preferably arrange, dispose, or locate the windows 42 such that the clutch assembly 10 is in a neutral or released second position, wherein only the first plurality of rockers 30A are in an engageable state with the inner surface 38 of the outer race 14. See FIGS. 3a-3c.

Markedly, the angle of the first and second surfaces 46, 48, and therefore guide slots 44, can differ from the 45 degree angle illustrated in FIG. 1 without departing from the scope of the present invention. Additionally, the circumferential disposition of the guide slots 44, and corresponding dispositions of mating components (e.g., windows 42 and body portion 50), as depicted in FIG. 1, may be reversed without departing from the scope of the present invention. By way of example, rotation of the selector ring 20 in a clockwise CCW direction could locate the windows 42 and body portion 50 such that the clutch assembly 10 is in the active position, whereas counterclockwise CCW rotation of the selector ring 20 would consequently locate the windows 42 and body portion 50 such that the clutch assembly 10 is in the neutral position, without departing from the scope of the present invention.

Turning now to FIG. 2a, wherein like reference numbers refer to like components from FIG. 1, a detailed schematic side-view of the rocker clutch assembly 10 is provided. The outer race 14 is disposed concentrically around the inner race 12, such that the outer surface 26 of the inner race 12 is in juxtaposition with the inner surface 38 of the outer race 14, and such that the pockets 28 are open in the direction of the teeth 40. Each of the first plurality of rockers 30A and each of the second plurality of rockers 30B is at least partially disposed within a respective one of the pockets 28, and is biased by a respective spring 34 into engagement with the teeth 40. The outer race 14 is selectively rotatable with respect to the inner race 12 about axis 16.

Figure 2B:
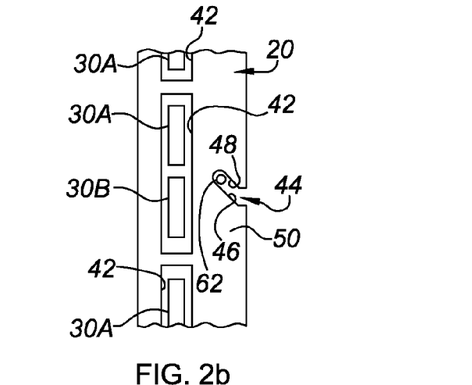
FIG. 2b is a schematic, elevated fragmentary illustration of two of the rockers and the selector ring of FIG. 2a in a first position.

FIG. 2a shows the rocker clutch assembly 10 while locked (or active) in both the clockwise CW and counter clockwise CCW directions such that the outer race 14 cannot rotate in either direction relative to the inner race 12. The selector ring 20 is disposed radially between the inner race 12 and the outer race 14, and is depicted in FIGS. 2a and 2b in the first position. When the selector ring 20 is in the first position, each window 42 is positioned such that a respective one of the first plurality of rockers 30A is extendable radially therethrough. Additionally, when the selector ring 20 is in the first position, each window 42 is positioned such that a respective one of the second plurality of rockers 30B is extendable radially therethrough.

Figure 2C:
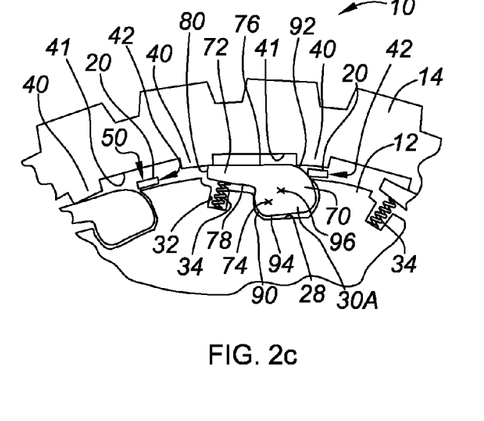
FIG. 2c is a schematic, fragmentary side-view illustrating one of the first plurality of rockers of FIG. 2a in a first interaction with the outer race.

Turning to FIG. 2c, a rocker 30A is depicted interacting with the inner race 12 and the outer race 14; the rocker 30A depicted in FIG. 2c is representative of all of the first plurality of rockers 30A. Rocker 30A includes a body portion 70 and an engagement arm or pawl 72 protruding from the body portion 70. According to the preferred embodiment, the engagement end 72 defines generally opposing first and second surfaces 76, 78, respectively, and a terminal end surface 80.

According to the preferred embodiment, the body portion 70 of each rocker 30A defines a pivot center or axis 74, and includes first, second, and third surfaces 90, 92 and 94, respectively. First and second surfaces 90, 92 are both circular cylindrical surfaces whose arcs are concentric with the pivot center 74. The first and second surfaces 90, 92 are configured to guide the rotation or pivoting of the rocker 30A and limit that pivoting to one degree of freedom.

As briefly noted above, spring 34 contacts surface 78, urging the engagement arm 72 of rocker 30A radially outward toward the outer race 14 so that the engagement arm 72 is positioned to engage with and abut against the teeth 40. In the context of the present application, an engagement arm 72, and therefore a rocker 30A, 30B, engages teeth 40 when a portion of the rocker 30A, 30B or engagement arm 72 is at a radial distance from the axis (shown at 16 in FIG. 2a) sufficient to contact one of the teeth 40. In the embodiment depicted, spring 34 biases the engagement arm 72 sufficiently radially outward such that, absent a counteracting force, the engagement arm 72 extends into one of the slots 41 defined between the teeth 40 of the outer race 14.

Each rocker 30A is configured to permit rotation of the outer race 14 with respect to the inner race 12 about the axis 16 in a first direction, and to prevent rotation of the outer race 14 with respect to the inner race 12 about the axis 16 in a second direction when the rocker 30A engages the teeth 40 of the outer race 14. In other words, the first plurality of rockers 30A is configured to transmit torque between the inner and outer races 12, 14 in the second direction, and to not transmit torque between the inner and outer races 12, 14 in the first direction. More specifically, each rocker 30A is configured such that, if the outer race 14 rotates counterclockwise relative to the inner race 12, one of the teeth 40 contacts surface 76 of each rocker 30A. The orientation of the surface 76, and the angle at which the tooth 40 contacts the surface 76, is such that the tooth 40 applies a force on the surface 76 that rotates the engagement arm 72 of the rocker 30A about the pivot axis 74 away from the outer race 14, compressing the spring 34. The rotation of the engagement arm 72 permits the tooth 40 to slide across surface 76 during relative rotation of the outer race with respect to the inner race in the counterclockwise direction. Thus, rockers 30A do not prevent rotation of the outer race 14 with respect to the inner race 12 in the counterclockwise direction. Ideally, the pivot center or axis 74 of each rocker 30A is parallel to axis 16.

Figure 2D:
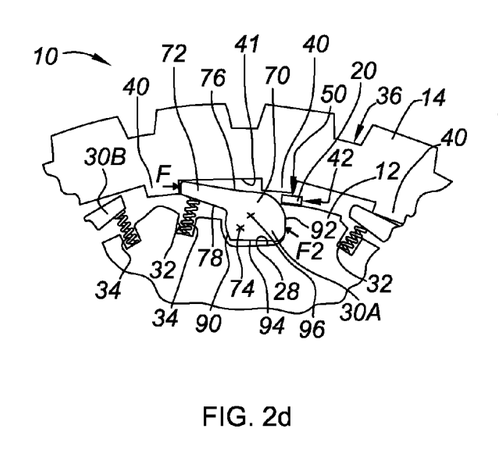
FIG. 2d is a schematic, fragmentary side-view illustrating one of the rockers of FIG. 2c in a second interaction with the outer race.

Referring to FIG. 2d, wherein like reference numbers refer to like components from FIGS. 1-2c, rocker 30A is depicted with the engagement arm 72 extending radially outward into slot 41. If the outer race 14 rotates clockwise with respect to the inner race 12, a tooth 40 contacts surface 80 of the engagement arm 72. The orientation of the surface 80, and the angle at which the tooth 40 contacts the surface 80, is such that the tooth 40 applies a force F on the surface 80, and surface 80 transmits a corresponding reaction force on the tooth 40, that prevents the outer race 14 from rotating with respect to the inner race 12 in the clockwise direction.

When surface 80 is in contact with a tooth 40, a reaction force, exemplified generally by arrow F2 in FIG. 2d, is applied to surface 92 from the inner race 12. Because the rotational center of surface 92 is preferably located at the pivot center 74, the reaction force F2 is distributed along surface 92 and produces no torque tending to pivot the rocker 30A about the pivot center 74. Optimally, surface 90 functions as a guiding surface—when rocker 30A is engaged with a tooth 40, there is preferably no reaction force applied to surface 90.

The surface 94 is configured to limit the rotation or pivoting of the rocker 30A in either the clockwise or counter clockwise direction. A center of mass 96 of the rocker 30A can be located in relation to the pivot center 74 such that centrifugal force tends either to engage or to disengage the rocker 30A, depending on whether the pockets 28, and thereby the relative disposition of rocker 30A, is defined with respect to the inner race 12 or the outer race 14.

Figure 2E:
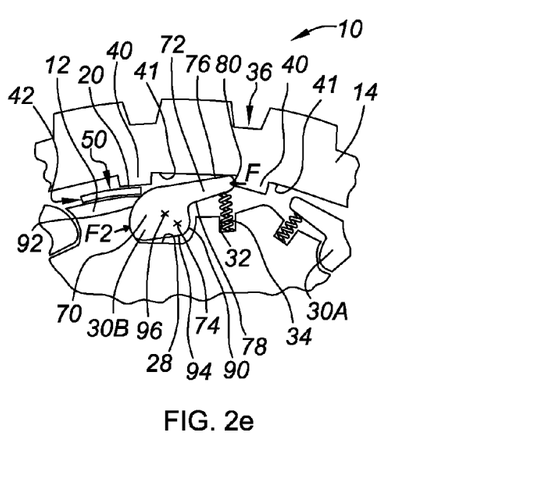
FIG. 2e is a schematic, fragmentary side-view of one of the second plurality of rockers of FIG. 2d interacting with the outer race.

Turning now to FIG. 2e, the rocker 30B is depicted interacting with the inner race 12 and the outer race 14; the rocker 30B depicted in FIG. 2e is representative of all of the second plurality of rockers 30B. Rockers 30B are geometrically substantially identical to rockers 30A except for their orientation with respect to the inner and outer races 12, 14. More specifically, the rockers 30B are oriented such that each rocker 30B permits rotation of the outer race 14 with respect to the inner race 12 in the second direction (e.g., clockwise) and prevents rotation of the outer race 14 with respect to the inner race 12 in the first direction (e.g., counterclockwise) when the rocker 30B engages the teeth 40 of the outer race 14. In other words, rockers 30B are configured to transmit torque between the inner and outer races 12, 14 in the first direction, and to not transmit torque between the races 12, 14 in the second direction when the rockers 30B are engaged with the teeth 40.

Spring 34 biases the engagement arm 72 of rocker 30B into slot 41 and into engagement with the teeth 40. If the outer race 14 rotates counterclockwise with respect to the inner race 12, one of the teeth 40 contacts surface 80 of the rocker 30B, and rotation of the outer race 14 in the counterclockwise direction with respect to the inner race 12 is prevented in the same manner that rockers 30A prevent rotation of the outer race 14 in the clockwise direction. If the outer race 14 rotates clockwise with respect to the inner race 12, the teeth 40 will contact surface 76 of the rocker 30B such that the rocker 30B pivots and permits the teeth 40 to slide across surface 76, thereby permitting rotation of the outer race 14 in the clockwise direction with respect to the inner race 12.

Figure 3A:
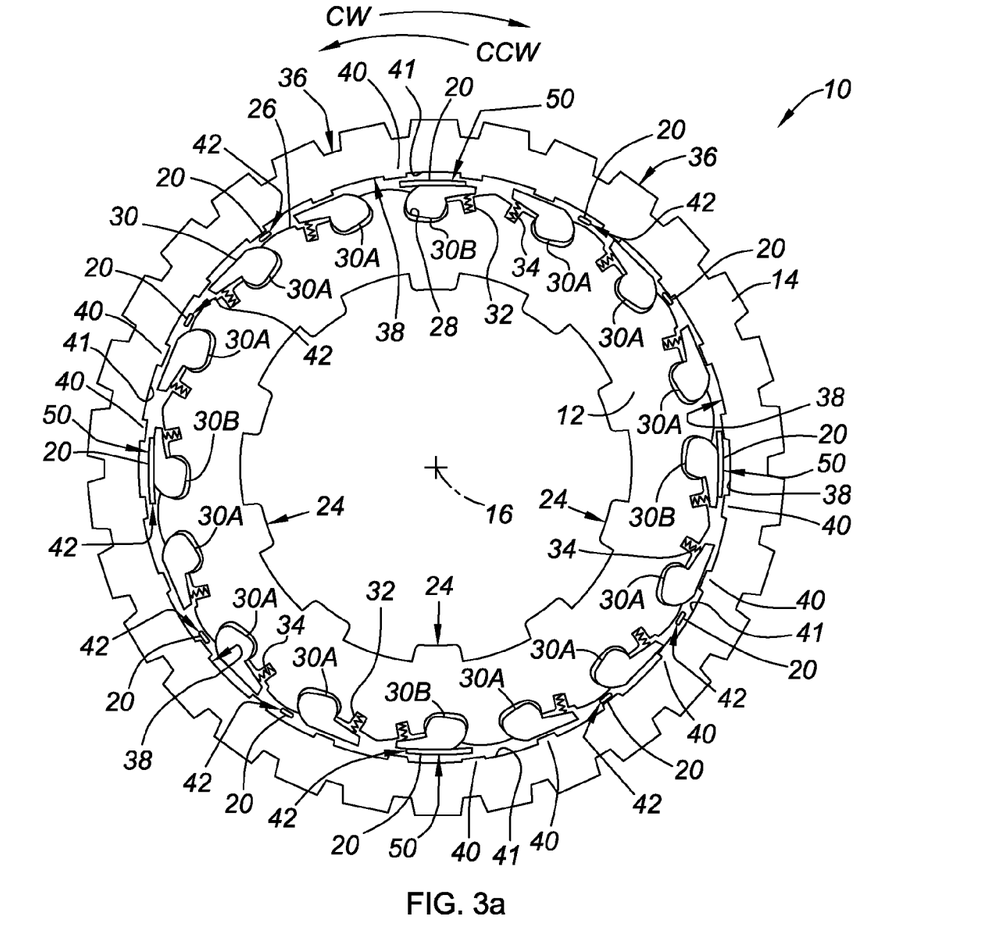
FIG. 3a is a schematic, side-view, taken along a plane that is perpendicular to the axis of rotation, of the clutch assembly of FIG. 1 illustrating the selector ring in a second position.
Figure 3B:
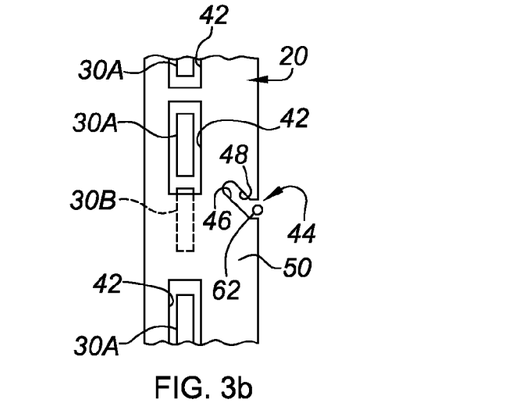
FIG. 3b is a schematic, elevated fragmentary illustration of the two rockers of FIG. 3a with the selector ring in the second position.

Referring to FIGS. 3a and 3b, wherein like reference numbers refer to like components from FIGS. 1-2e, the selector ring 20 is selectively translatable in the axial direction from the first position (shown in FIGS. 2a and 2b) to the second position shown in FIGS. 3a and 3b. When in the second position, the selector ring 20 permits the first plurality of rockers 30A to engage the teeth 40 of the outer ring 14 in both the first and second directions. Thus, the function of the rockers 30A is identical when the selector ring 20 is in either the first or the second position. However, when the selector ring 20 is in the second position, FIG. 2a, body portion 50 of the selector ring 20 is positioned radially between the second plurality of rockers 30B and the outer race 14, thereby preventing engagement of the rockers 30B with the teeth 40 of the outer race 14.

Figure 3C:
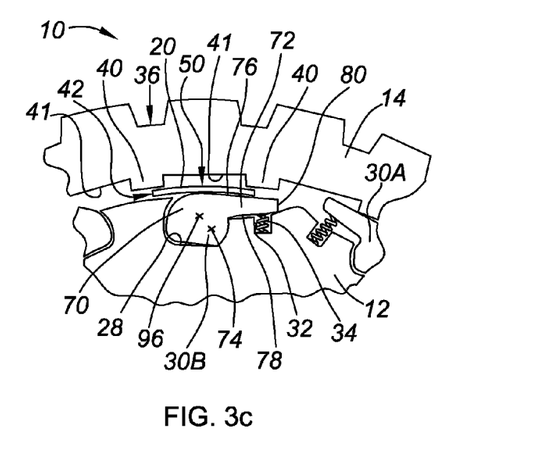
FIG. 3c is a schematic, fragmentary side-view illustrating one of the second plurality of rockers of FIG. 3a in a retracted position.

More specifically, and with reference to FIG. 3c, movement of the ring 20 from the first to the second position causes body portion 50 to contact surface 76 of rocker 30B and counteract the bias of spring 34, thereby pivoting the rocker 30B out of engagement with the teeth 40 of the outer race 14. In other words, the selector ring 20 retains the rockers 30B in a retracted position in which no part of the rockers 30B extends sufficiently radially outwards to contact or otherwise interact with the teeth 40 or the notches 41 when in the second position.

Accordingly, with the selector ring 20 in the second position, the rockers 30A prevent the rotation of the outer race 14 in the clockwise CW direction, and rockers 30B do not engage the teeth, thereby allowing the outer race to rotate in the counterclockwise CCW direction relative to the inner race 12. The ability of the clutch assembly 10 to convey torque between the first and second races 12, 14 in one direction is selectively variable by rotating the selector member 20. Movement of the selector member 20 from the first position, e.g., FIGS. 2a-2e, to the second position, e.g., FIGS. 3a-3c, causes the torque carrying ability of the clutch assembly 10 to change from dual-directional to single-directional.

Figure 4:
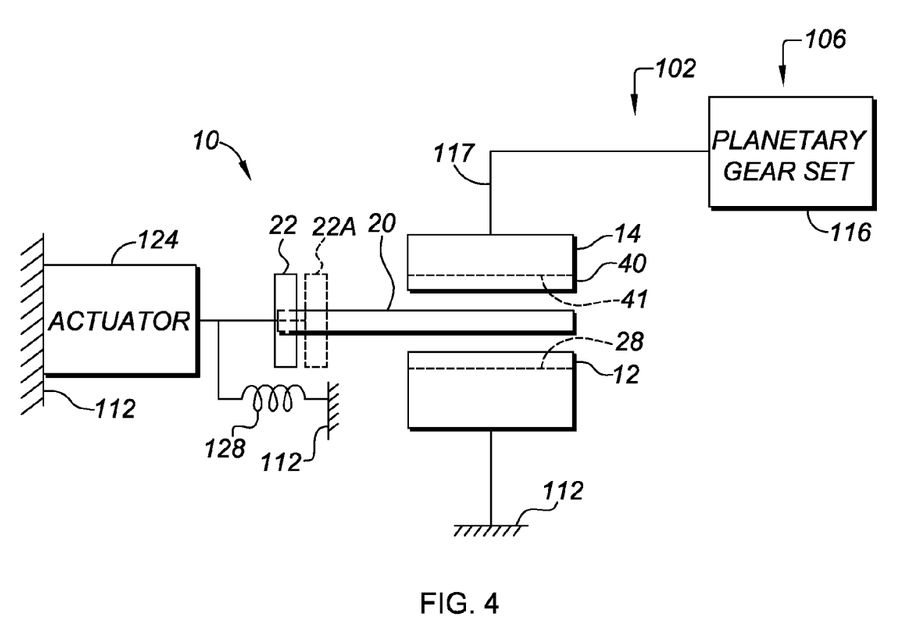
FIG. 4 is a schematic side-view illustration of a portion of the clutch assembly of FIG. 1 operatively connected to an actuator that is configured to selectively move the apply plate, and thus the selector ring between the first and second positions.

In reference to FIG. 4, the clutch assembly 10 of FIGS. 1-3c is schematically depicted installed in a vehicle, represented generally as 102, as part of a powertrain component 106, which may, for example, be a dual clutch transmission (DCT), hybrid powertrain, manual transmission, automatic transmission, engine accessory drive, etc, which will be described in extensive detail hereinbelow. The inner race 12 is mounted with respect to a stationary member 112, such as a transmission housing or backing plate, chassis frame, or the vehicle body, to prevent rotation of the inner race 12 with respect to the stationary member 112. The outer race 14 is mounted with respect to a rotatable member, represented generally as 117, for rotation therewith. In the embodiment depicted in FIG. 4, the rotatable member 117 is preferably a member of a planetary gearset 116. However, the present invention is not restricted to the structure of FIG. 4, whereby the rotatable member may, for example, be a range gear in a countershaft transmission (now shown) or the like.

An actuator 124, such as a hydraulically or pneumatically actuated piston, a solenoid, or the like, is mounted with respect to the stationary member 112. The actuator 124 is operatively connected to the apply plate 22, and configured to selectively reposition the selector ring 20 relative to the stationary member 112 between the first position shown, and second position (illustrated in phantom in FIG. 4 as 22A) through translation of pins 62 within guide slots 44, as discussed above with respect to FIGS. 2b and 3b.

A return spring 128 operatively interconnects the stationary member 112 and the selector ring 20 to bias the selector ring 20 in the first position. Alternatively, the return spring 128 can operatively interconnect the stationary member 112 and the apply plate 22 to bias the selector ring 20 in the first position. As a further alternative, the return spring 128 can be configured to bias the selector ring 20 in the second position.

The selector ring 20 is limited when rotating with respect to the stationary member 112, and therefore with respect to the inner race 12, such as by its connection to the apply plate 22 via pins 62 and guide slots 44 of FIG. 1, so that the windows 42 of the selector ring 20 maintain their alignment with a respective rocker 30. The apply plate 22 is splined or coupled with respect to the stationary member 112, such as via the teeth (shown at 54 in FIG. 1) so that the apply plate 22 is axially translatable, but not rotatable with respect to the stationary member 112 and the inner race 12.

It should be noted that, if the actuator 124 is characterized by insufficient linear travel to move the selector ring 20 between the first and second positions, various linear travel amplifiers (not shown) may be employed. In an exemplary embodiment, radially-oriented levers may interconnect the actuator and the ring. Alternatively, in place of a lever, a single slotted disk may be employed. The disk may also serve as a piston return spring if formed of an elastic material.

FIG. 5 is a schematic fragmentary cross-sectional view of a transmission 206 illustrating first and second rocker clutches 210 and 210A mounted to an input shaft 236. The first and second rocker clutches 210 and 210A operate to substantially lock gears 241 and 241A, respectively, to the input shaft 236 of the transmission 206, in order to provide various gear ratios. The first and second gears 241, 241A are rotatably mounted with respect to the input shaft 236 by first and second bearings 243 and 243A, respectively. First and second inner races 212, 212A of each respective clutch 210, 210A are preferably fixedly mounted (e.g., via splined inner surfaces similar to surface 24 of FIG. 1) and coaxially oriented with respect to the input shaft 236.

The first and second outer races 214, 214A of each respective clutch 210, 210A are circumferentially disposed about first and second inner races 212, 212A, respectively, and thus coaxially oriented with respect to the input shaft 236. In a similar regard, the first and second outer races 214, 214A are rigidly mounted with respect to the first and second gears 241, 241A, respectively (e.g., via splined outer surfaces similar to surface 36 of FIG. 1.) The first and second inner races 212, 212A define a plurality of pockets 228, 228A, respectively, each configured to retain a first and second group of rockers 230, 230A, respectively. First and second inner surfaces 238, 238A of the outer races 214, 214A respectively define a plurality of teeth 240, 240A.

Referring still to FIG. 5, the selective engagement of the gears 241 and 241A may be performed by the translational movement of a shift fork 250 slidably mounted to a shaft 252. The shift fork 250 will engage a selector sleeve 254 having three axial positions relative to the rocker clutches 210 and 210A. These three axial positions are maintained by a detent mechanism 256. The detent mechanism 256 includes a spring 258 operable to bias a ball 260, which operates to engage first, second, and third detents or recesses 264, 266, and 268, respectively, formed on the selector sleeve 254. First and second apply plates 222, 222A cooperatively interface with the selector sleeve 254 and are operable to selectively engage first and second selector rings 220, 220A, respectively, functioning as described above with respect to apply plate 22 and selector ring 20.

By arranging or disposing the selector sleeve 254 in the middle position, corresponding to second detent 266 of FIG. 5, which is preferably the default position of the selector sleeve 254, both rocker clutches 210 and 210A are in a neutral or released state. In other words, when the selector sleeve 254 is in the middle position/second detent 266, the first selector ring 220 is positioned to deactivate at least one rocker defined by a first group of rockers 230. Similarly, when the selector sleeve 254 is in the middle position/second detent 266, the second selector ring 220A is positioned to deactivate at least one rocker defined by a second group of rockers 230A.

By sliding, shifting or translating the shift fork 250 to the right, e.g., according to arrow R in FIG. 5, the selector sleeve 254 will be urged or forced to the third detent position 268 and will axially translate the first and second apply plates 222, 222A to the right. In the embodiment of FIG. 5, when the apply plates 222, 222A shift axially in the rightward direction, the first selector ring 220 is rotated (e.g., through repositioning a pin 62 within a corresponding slot 44, see FIG. 2a) to thereby activate or engage first rocker clutch 210. More specifically, both sets of rockers defined by first rockers 230 are engageable with the teeth 240 of the first outer race 214 (e.g., first and second plurality of rockers 30A and 30B, described above with respect to FIGS. 2a-2e.) However, the second selector ring 220A is not rotated when the shift fork 250 is slid or shifted to the right, and therefore remains in a neutral position.

Still referring to FIG. 5, by sliding, shifting or translating the shift fork 250 to the left, e.g., according to arrow L, the selector sleeve 254 will be urged or forced to the first detent position 264 and will axially translate the first and second apply plates 222, 22A to the left. Accordingly, the second selector ring 220A is rotated (e.g., through repositioning a pin 62 within a corresponding slot 44, see FIG. 2a) to thereby activate or engage the second rocker clutch 210A. More specifically, both sets of rockers defined by second rockers 230A are engageable with the teeth 240A of the second outer race 214A (e.g., first and second plurality of rockers 30A and 30B, described above with respect to FIGS. 2a-2e.) However, the first selector ring 220 is not rotated when the shift fork 250 is slid or shifted to the left, and therefore remains in a neutral position.

Figure 6:
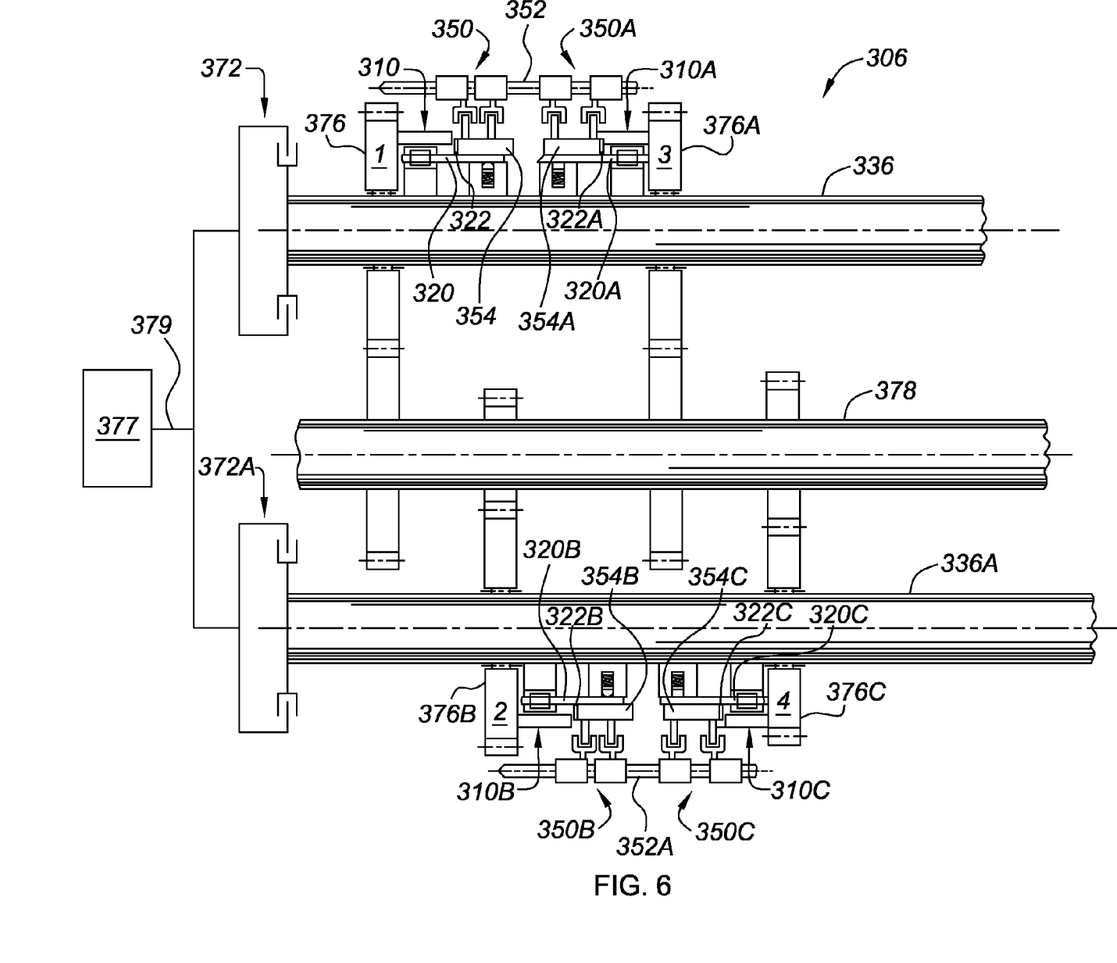
FIG. 6 is a schematic fragmentary cross-sectional view of an exemplary Dual Clutch Transmission, or DCT, architecture employing a plurality of input shaft mounted, selectable one-way rocker clutch assemblies of the present invention.

FIG. 6 is a schematic fragmentary cross-sectional view of a Dual Clutch Transmission (or DCT) 306 employing a plurality of selectively engageable one-way rocker clutch assemblies mounted with respect to a first input shaft 336, represented herein by first and third rocker clutches 310, 310A, respectively. Additionally, a plurality of selectively engageable one-way rocker clutch assemblies are mounted with respect to the second input shaft 336A, represented herein by second and fourth rocker clutches 310B, 310C, respectively. Use of one-way rocker clutch assemblies 310, 310A, 310B, 310C within the DCT 306 will ideally simplify the control scheme of first and second transmission input clutches 372 and 372A, as will be described hereinbelow.

Preferably, the first and third one-way rocker clutches 310, 310A are fixedly mounted with respect to the first input shaft 336, which supports first and third gear sets 376 and 376A, respectively, in a rotatable manner, also referred to herein cumulatively as the odd gear sets. Similarly, the second and fourth one-way rocker clutches 310B, 310C are preferably fixedly mounted with respect to the second input shaft 336A, which supports second and fourth gear sets 376B and 376C, respectively, in a rotatable manner, also referred to herein cumulatively as the even gear sets. Additionally, to transfer torque from an engine 377 to the DCT 306 via engine output shaft 379, at least one of the first and second input clutches 372, 372A, respectively, must also be operatively engaged.

The shifting operation of the DCT 306 can best be understood by way of the following: in first gear (preferably corresponding to a first forward speed ratio), the first one-way rocker clutch assembly 310 will be engaged to lock or interconnect the first gear set 376 to the first input shaft 336, thereby providing the requisite gear ratio to transmission output shaft 378. Functioning analogously to the first forward speed ratio, the second one-way rocker clutch assembly 310B is operable to lock, engage, or interconnect the second gear set 376B, corresponding to the second forward range, to the second input shaft 336A.

The plurality of selectable one-way rocker clutch assemblies depicted in FIG. 6, e.g., 310, 310A, 310B, 310C, are engaged/activated, or disengaged/released, via translational movement of corresponding first and third shift forks 350, 350A slidably mounted to a first shaft 352, and corresponding second and fourth shift forks 350B, 350C slidably mounted to a second shaft 352A, functioning synonymously with the shift fork 250 described above with respect to FIG. 5. More particularly, the shift forks 350, 350A, 350B, 350C engage with corresponding selector sleeves 354, 354A, 354B, 354C to cooperatively interface with and reposition matching selector rings 320, 320A, 320B, 320C, via apply plates 322, 322A, 322B, 322C, respectively.

Notably, the second rocker clutch 310B of FIG. 6 may engage the second gear set 376B while the first gear set 376 is engaged. However, the second input clutch 372B must be disengaged (i.e., deactivated so no torque is being transmitted from the engine 377 to the second input shaft 336A) during this pre-selection operation to avoid lockup or tie-up of the DCT 306. Prior to shifting to the second gear set 376B, the first rocker clutch assembly 310 remains engaged with the first gear set 376, but is set to a "freewheel" ready state. When the aforementioned shift is desired, the second input clutch 372A is engaged, and the first rocker clutch assembly 310 is set to "freewheel". With the first rocker clutch assembly 310 "freewheeling", de-clutching of the first input clutch 372 during the shift is not necessarily required e.g., shifting of the DCT 306 will cause little torque interruption and will therefore provide a smooth shift feel to vehicle operators and passengers. This characteristic may reduce the control system complexity for the operation of the DCT 306. Shifts from the second gear set 376B to the third and fourth gear sets 376A, 376C, as well as downshifts, follow a similar sequence.

Figure 7:
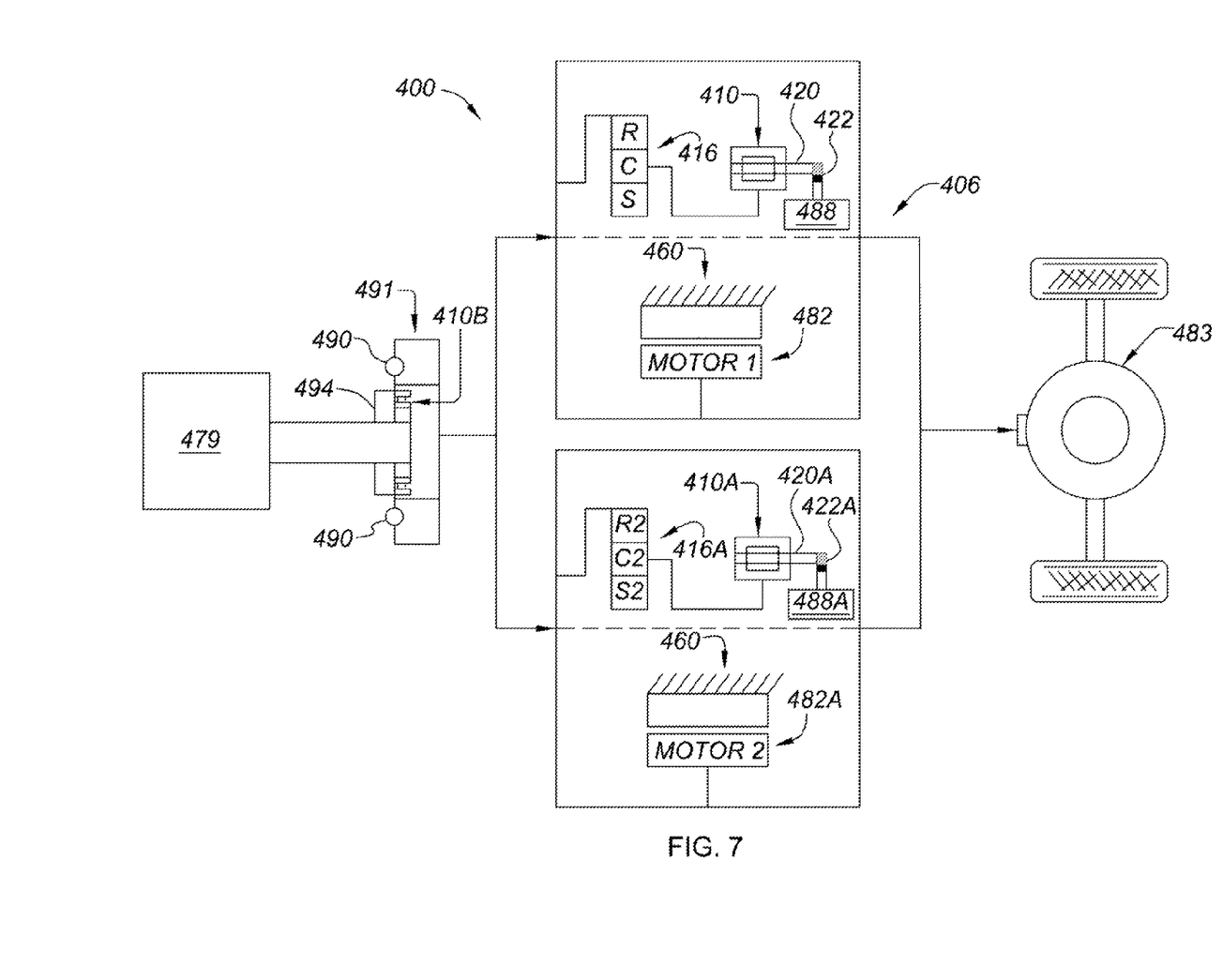
FIG. 7 is a schematic illustration of the various components of an exemplary hybrid powertrain system employing a plurality of the selectable one-way rocker clutch assemblies of the present invention.

Looking now to FIG. 7, a schematic diagram illustrating an exemplary hybrid powertrain system 400 having an engine 479, hybrid transmission 406, and a final drive 483. In the embodiment depicted, the engine 479 may be a fossil fuel engine, such as a diesel engine which is readily adapted to provide its available power output typically delivered at a constant number of revolutions per minute (RPM).

The hybrid transmission 400 employs a plurality of selectable one way rocker assemblies, represented in FIG. 7 by first and second rocker clutch assemblies 410 and 410A, respectively, in conjunction with a one or more generators or motors, represented in FIG. 7 by first and second motor/generators 482 and 482A. The hybrid transmission 406 utilizes a plurality of differential gear sets, preferably in the nature of first and second planetary gear sets 416 and 416A, which are selectively engageable by first and second rocker clutch assemblies 410 and 410A. Ideally, the stator of the first motor/generator 482 is secured to a stationary member or ground, such as the transmission housing 460, while the rotor of the first motor/generator 482 is secured to the first planetary gear set 416, via, for example, ring gear member R. In a similar regard, the stator of the second motor/generator 482A is preferably secured to the transmission housing 460, while the rotor of the second motor/generator 482A is secured to the second planetary gear set 416A, via, for example, ring gear member R2.

In the exemplary embodiment of FIG. 7, the first planetary gear set 416 employs an outer gear member, typically designated as the ring gear R. The ring gear member R circumscribes an inner gear member, typically designated as the sun gear S. A carrier member C rotatably supports a plurality of planet gears (not shown) such that each of the planet gears meshingly engages both the outer, ring gear member R and the inner, sun gear member S of the first planetary gear set 416.

Similar to the first planetary gear set 416, the second planetary gear set 416A also has an outer gear member, such as ring gear R2 that circumscribes an inner gear member, such as sun gear member S2. A plurality of planet gears (not shown) are also rotatably mounted in a carrier member C2 such that each planet gear member simultaneously and meshingly engages both the outer, ring gear member R2 and the inner, sun gear member S2 of the second planetary gear set 416A.

The hybrid powertrain system 400 will enable multiple modes of operation with the possibility of higher system efficiency. The first and second rocker clutch assemblies 410 and 410A are employed to assist in the selection of the operational modes of the hybrid transmission 400. The shifting from one mode of operation to another is synchronous due to the minimal slip speed across the rocker clutch assemblies 410, 410A. This configuration may also result in improved packaging and lower spin losses than traditional clutch mechanisms.

The first rocker clutch assembly 410 may be integrated within the hybrid transmission 400 in place of a traditional hydraulically actuated plate-type clutch (not shown.) The rocker clutch assemblies 410 and 410A may use hydraulic actuators 488 and 488A', respectively, to effect engagement, the actuators 488 and 488A functioning similarly to the actuators employed for hydraulic plate-type clutch engagement. However, the hydraulic actuators 488 and 488A are operable to selectively engage the apply plates 420, 420A with the selector rings 422, 422A, respectively. By way of example, the hydraulic actuator 488 will be de-stroked for operating modes requiring the engagement of the first rocker clutch assembly 410. Conversely, when the hydraulic actuator 488 is stroked, the first rocker clutch assembly 410 will "freewheel". The same principle of operation applies to the second rocker clutch assembly 410A and actuator 488A.

An additional selectable one-way rocker clutch assembly 410B within the hybrid transmission 400 is also shown in FIG. 7. The additional clutch 410B is intended to be used to bypass torsional springs 490 located within a damper 491 when starting or shutting down the engine 479. In this embodiment, a hydraulic actuator 494 will engage and disengage the one-way rocker clutch assembly 410B. The damper 491 operates to isolate the transmission 400 from the torsional vibrations caused by the firing pulses of the engine 479. However, when shutting down or restarting the engine 479, such as when transitioning into and out of electric mode, the compliance of the damper 491 may impart a resonance to the hybrid transmission 400. Therefore, it is beneficial to bypass the springs 490 when shutting off and restarting the engine 479. The rocker clutch assembly 410B may result in improved packaging and lower torque losses than traditional clutching mechanisms.

While the best modes for carrying out the invention have been described in detail, those familiar with the art to which this invention relates will recognize various alternative designs and embodiments for practicing the invention within the scope of the appended claims.

The invention claimed is:

1. A selectable one-way rocker clutch assembly comprising:
    a first rotatable race defining a plurality of pockets;
    a second rotatable race radially spaced from and axially aligned with said first race and defining a plurality of teeth;
    a first plurality of rockers operatively retained by said pockets of said first race, said first plurality of rockers configured to selectively engage said teeth of said second race to resist rotation of said second race relative to said first race in a first direction;
    a second plurality of rockers operatively retained by said pockets of said first race, said second plurality of rockers configured to selectively engage said teeth of said second race to resist rotation of said second race relative to said first race in a second direction;
    a selector member operatively engageable with said first and second pluralities of rockers and configured to selectively rotate between at least a first and a second position, said selector member preventing engagement of at least one of said first and second plurality of rockers with said teeth when in said second position, said selector member defining a slot; and an apply plate having a pin that is axially aligned with the slot;

wherein the slot is configured such that axial movement of the apply plate causes the pin to urge the selector member to rotate between the first and second positions.

2. The rocker clutch assembly of claim 1, wherein said selector member permits engagement of said first plurality of rockers with said teeth when in said first and second positions; and wherein said selector member permits engagement of said second plurality of rockers with said teeth when in said first position and prevents engagement of said second plurality of rockers with said teeth when in said second position.

3. The rocker clutch assembly of claim 1, wherein said selector member is generally annular, and is at least partially radially disposed between said first and second races.

4. The rocker clutch assembly of claim 3, wherein said selector member defines a plurality of apertures configured to allow said first and second plurality of rockers to extend through said apertures when said selector member is in said first position.

5. The rocker clutch assembly of claim 4, wherein said selector member further defines a body portion configured to prevent engagement of at least said second plurality of rockers with said teeth when said selector member is in said second position.

6. The rocker clutch assembly of claim 5, wherein the apply plate is generally annular, and has a radially inner surface that defines the pin.

7. The rocker clutch assembly of claim 6, further comprising:
a plurality of biasing members, wherein said first and second pluralities of rockers are biased by a respective one of said biasing members into engagement with said teeth of said second race.

8. The rocker clutch assembly of claim 7, wherein said first race is at least partially disposed radially inside said second race.

9. The rocker clutch assembly of claim 7, wherein said second race is at least partially disposed radially inside said first race.

10. A selectable rocker clutch assembly comprising:
an outer race defining a plurality of teeth;
an inner race disposed radially within said outer race, said inner race defining a plurality of pockets;
a plurality of springs;
a plurality of rockers at least partially positioned within respective ones of said plurality of pockets, said plurality of rockers being biased by a respective one of said springs into engagement with said plurality of teeth to thereby resist rotation of the outer race relative to the inner race; and
a selector member at least partially disposed radially between said inner and outer races, said selector member being selectively rotatable between at least a first and a second position, wherein said selector member is configured to prevent engagement of at least one of said plurality of rockers with said teeth when in said second position, said selector member defining a slot; and
an apply plate having a pin that is axially aligned with the slot;
wherein the slot is configured such that axial movement of the apply plate causes the pin to urge the selector member to rotate between the first and second positions.

11. The rocker clutch assembly of claim 10, wherein said plurality of rockers define at least a first and second plurality of rockers, said first plurality of rockers configured such that engagement with said teeth prevents rotation of said outer race with respect to said inner race in a first direction, and said second plurality of rockers configured such that engagement with said teeth prevents rotation of said outer race with respect to said inner race in a second direction.

12. The rocker clutch assembly of claim 11, wherein said selector member is generally annular, and is at least partially radially disposed between said first and second races.

13. The rocker clutch assembly of claim 12 wherein the apply plate is generally annular, and has a radially inner surface that defines the pin.

14. The rocker clutch assembly of claim 13, wherein said selector member defines a plurality of apertures and a body portion, said apertures being configured to allow said first and second plurality of rockers to extend there through when said selector member is in said first position, and said body portion being configured to prevent engagement of at least said second plurality of rockers with said teeth when said selector member is in said second position.

15. The rocker clutch assembly of claim 14, further comprising:
an actuator operatively connected to said apply plate and configured to provide said selective translation of said apply plate toward or away from said selector member.

16. The selectable rocker clutch assembly of claim 15, implemented in combination with one of a hybrid transmission, a manual transmission, a dual clutch transmission, a transfer case, or an engine accessory drive.

17. A transmission for a motorized vehicle, comprising:
at least one drive gear;
at least one driven gear in meshing relationship with a respective one of said at least one drive gears;
a first input shaft having one of said at least one drive gears rotatably mounted thereon;
an output shaft having one of said at least one driven gears fixedly mounted thereon; and
at least one selectable one-way rocker clutch, including:
an outer race defining a plurality of teeth;
an inner race disposed radially within said outer race, said inner race defining a plurality of pockets;
a first plurality of rockers operatively retained by said pockets of said inner race, said first plurality of rockers configured to selectively engage said teeth of said outer race to resist rotation of said outer race relative to said inner race in a first direction;
a second plurality of rockers operatively retained by said pockets of said inner race, said second plurality of rockers configured to selectively engage said teeth of said outer race to resist rotation of said outer race relative to said inner race in a second direction; and
a selector ring at least partially disposed between said inner and outer races;
an apply member configured to selectively operatively engage with said selector ring to thereby selectively rotate said selector ring between at least a first and a second position, wherein said selector ring is configured to prevent engagement of at least one of said plurality of rockers with said teeth when in said second position;

at least one positionable selector sleeve operable to selectively engage and disengage a respective one of said at least one selectable rocker clutches;

a detent mechanism operable to maintain a desired position of said selector sleeve; and at least one shift fork operable to move said selector sleeve;

wherein one of said at least one selectable rocker clutches is disposed between said first input shaft and said at least one drive gear mounted thereon and operable to selectively engage and disengage said first input shaft with respect to said at least one drive gear mounted thereon so that said at least one drive gear may rotate with substantially the same rotational speed as said first input shaft when engaged and to rotate independently with respect to said first input shaft when disengaged.

18. The transmission of claim 17, further comprising:

a second input shaft having a second input clutch and at least one of said drive gears rotatably mounted thereon;

wherein said first input shaft has a first input clutch; and wherein one of said at least one selectable rocker clutches is disposed between said second input shaft and said at least one drive gear mounted thereon and operable to selectively engage and disengage said second input shaft with said at least one drive gear mounted thereon so that said at least one drive gear may rotate with substantially the same rotational speed as said second input shaft when engaged and to rotate independently with respect to said second input shaft when disengaged.

* * * * *